US012141827B1

(12) United States Patent
Kasaragod et al.

(10) Patent No.: US 12,141,827 B1
(45) Date of Patent: Nov. 12, 2024

(54) GLOBAL SEGMENTING AND SENTIMENT ANALYSIS BASED ON GRANULAR OPINION DETECTION

(71) Applicant: Amazon Technologies, Inc., Seattle, WA (US)

(72) Inventors: Sunil Mallya Kasaragod, San Francisco, CA (US); Abhinav Goyal, Snohomish, WA (US); Yahor Pushkin, Redmond, WA (US); Srikanth Doss Kadarundalagi Raghura, Seattle, WA (US); Rishita Rajal Anubhai, Seattle, WA (US); Kasturi Bhattacharjee, Sunnyvale, CA (US); Smaranda Muresan, New York, NY (US); Siddharth Chaitanyakumar Varia, Northville, MI (US); Federico Torreti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 405 days.

(21) Appl. No.: 17/548,055

(22) Filed: Dec. 10, 2021

(51) Int. Cl.
*G06F 40/284* (2020.01)
*G06F 40/205* (2020.01)
*G06Q 10/0631* (2023.01)
*G06Q 30/0204* (2023.01)

(52) U.S. Cl.
CPC ....... *G06Q 30/0205* (2013.01); *G06F 40/205* (2020.01); *G06F 40/284* (2020.01); *G06Q 10/06315* (2013.01)

(58) Field of Classification Search
USPC ................................................ 704/7–10, 257
See application file for complete search history.

(56) References Cited

U.S. PATENT DOCUMENTS

| 8,166,032 | B2 | 4/2012 | Sommer et al. | |
|---|---|---|---|---|
| 8,417,713 | B1* | 4/2013 | Blair-Goldensohn | G06F 16/9535 705/347 |
| 8,515,739 | B2* | 8/2013 | Godbole | G06F 40/35 707/706 |
| 2011/0246179 | A1* | 10/2011 | O'Neil | G06F 16/3344 704/9 |
| 2013/0173269 | A1* | 7/2013 | Adler | G10L 25/63 704/E15.001 |
| 2018/0082389 | A1* | 3/2018 | Guggilla | G06N 20/00 |
| 2018/0232362 | A1 | 8/2018 | Khan | |
| 2018/0322114 | A1* | 11/2018 | Kuo | G06Q 10/067 |

* cited by examiner

*Primary Examiner* — Leonard Saint-Cyr
(74) *Attorney, Agent, or Firm* — Robert C. Kowert; Kowert, Hood, Munyon, Rankin & Goetzel, P.C.

(57) ABSTRACT

A global segmenting and analysis service of a provider network may receive documents (e.g., posts, product reviews) from different applications. The service may analyze the documents to identify target entities and sentiment. The service may generate different levels of sentiment data and store data into a segmented database. For example, the service may store within-document level sentiment, document-level sentiment, and multi-document level sentiment for a target entity. The service may also update the entity taxonomy automatically or with only a small number of sample documents. The client may query the service for the segmented sentiment data.

20 Claims, 13 Drawing Sheets

The staff was beyond rude. I usually avoid RestaurantX because of the disrespectful staff, slow lines, and constant issues with my order. If I could give them no stars, oh I definitely would.

⟹ Targeted Sentiment Analysis

TARGET    CAUSE
The staff was beyond rude. I usually avoid RestaurantX because of the
    CAUSE TARGET CAUSE                              CAUSE
disrespectful staff, slow lines, and constant issues with my order.
            TARGET
If I could give them no stars, oh I definitely would.

ENTITY-MENTION/SPAN-LEVEL SENTIMENT ANALYSIS 202

Target: staff
Sentiment: NEG
Intensity: HIGH (-0.8)
Cause: "rude"

Target: RestaurantX
Sentiment: NEG
Intensity: HIGH (-0.7)
Cause: "disrespectful staff"
"slow lines"
"constant issues with my order"

Target: staff
Sentiment: NEG
Intensity: HIGH (-0.6)
Cause: "disrespectful"

Target: them
Sentiment: NEG
Intensity: HIGH (-0.9)

Went to drive thru at RestaurantX. Asked to have a salad. Was told they no longer have salads, such a disappointment. Guess fattening fast food is so much better... NOT! I will not go there again.

⟹ Targeted Sentiment Analysis

TARGET
Went to drive thru at RestaurantX. Asked to have a salad. Was told
TARGET    CAUSE  TARGET                              CAUSE   TARGET
they no longer have salads, such a disappointment. Guess fattening fast food
              TARGET
is so much better... NOT! I will not go there again.

ENTITY-MENTION/SPAN-LEVEL SENTIMENT ANALYSIS 204

Target: RestaurantX
Sentiment: NEG

Target: salad
Sentiment: NEG

Target: fast food
Sentiment: NEG
Intensity: HIGH (-0.8)
Cause: "fattening"

Target: staff
Sentiment: NEG
Intensity: HIGH (-0.7)
Cause: "no longer have salads"

Target: salads
Sentiment: POS
Intensity: HIGH (0.7)

Target: staff
Sentiment: NEG
Intensity: HIGH (-0.8)

FIG. 2A

| ID | Entity Type | Tag | Definition |
|---|---|---|---|
| 1 | Person | PER | Individuals, groups of people, nicknames, fictional characters, animal names, etc. |
| 2 | Location | LOC | Geographical locations such as countries, cities, states, addresses, geological formations, bodies of water, natural landmarks, and astronomical locations. |
| 3 | Organization | ORG | Governments, companies, sports teams, religions, etc. |
| 4 | Facility | FAC | Buildings, airports, highways, bridges, and other permanent man-made structures and real estate improvements. |
| 5 | Brand | BRAND | Organization, group, or producer of a specific commercial item or line of products. |
| 6 | Commercial Item | COMM | Any non-generic purchasable or acquirable item, including vehicles, and large products that had only one item produced. |
| 7 | Movie | MOVIE | A movie or television show, whether full name, nickname, or subtitle. |
| 8 | Music | MUSIC | A song, whether full or partial, as well as a collection of individual music creations, such as an album or anthology. |
| 9 | Book | BOOK | A book, whether professionally or self published. |
| 10 | Software | SOFT | An officially released software product. |
| 11 | Game | GAME | A game, whether video game, board game, common game, or sport. |
| 12 | Personal Title | PERSON: TITLE | Official titles and honorifics such as president, PhD, Dr., etc. |
| 13 | Event | EVENT | Festival, concert, election, war, conference, promotional events, etc. |
| 14 | Date | DATE | Any reference to a date or time, whether specific or general, whether absolute or relative. |
| 15 | Quantity | QUANT | All measurements along with their units (currency, percent, number, bytes, etc.) |
| 16 | Attribute | ATTRIBUTE | An attribute, characteristic, or trait of an entity. (e.g. the "quality" of a product, the "price" of a phone, the "speed" of a CPU) |
| 17 | Other Entity | OTHER | Things that are entities, but don't fit into any of the above |

FIG. 4

GLOBAL SEGMENTING AND SENTIMENT ANALYSIS BASED ON GRANULAR OPINION DETECTION

BACKGROUND

As the number of social media applications and various other internet applications has grown, the amount of feedback that companies and other organizations have access to has grown. For example, businesses have access to vast amounts of social media posts, reviews, blogs and news articles that contain information relating to how customers feel about their brands, products, and services. Understanding this information may be essential for these businesses to react quickly to customer feedback or to identify issues with their offering. Businesses have utilized manual processes to assess customer sentiment. For example, businesses often depend on customer service representatives to identify feedback and patterns in customer complaints. However, these types of manual processes are error prone, time consuming, and are unable to scale to large amounts of textual feedback. Furthermore, customer service reps may miss some of the feedback and patterns in customer complaints when reviewing large amounts of data.

BRIEF DESCRIPTION OF THE DRAWINGS

FIGS. 2A and 2B illustrate examples of implementing global segmenting and sentiment analysis based on granular opinion detection on documents, according to some embodiments.

FIG. 4 is a illustrates an example of an entity taxonomy of a client, according to some embodiments.

Figure 1:
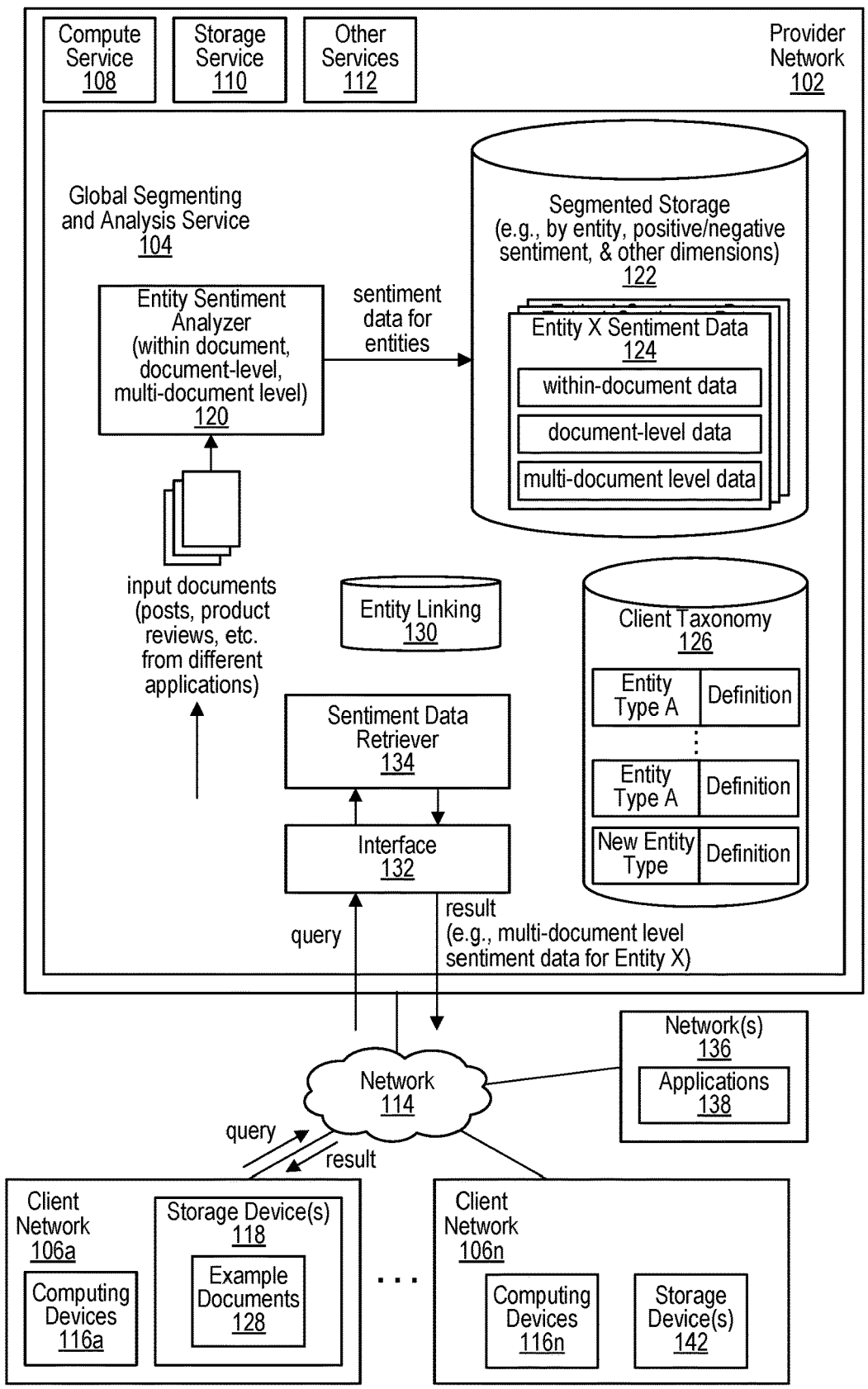
FIG. 1 is a logical block diagram illustrating a system for global segmenting and sentiment analysis based on granular opinion detection, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement global segmenting and sentiment analysis based on granular opinion detection, according to some embodiments. In embodiments, implementing global segmenting and sentiment analysis based on granular opinion detection (e.g., via a global segmenting and analysis service) may allow a client to analyze a much larger amount of data to determine sentiment/feedback, compared to traditional techniques such as manual processes.

Embodiments may provide various other advantages over traditional techniques. For example, implementing global segmenting and sentiment analysis based on granular opinion detection greatly reduce the amount of time to retrieve and analyze data originating from any number of applications to determine sentiment. Moreover, embodiments may reduce or eliminate data retrieval errors and data analysis errors.

Various embodiments may generate segmented data, which can then be queried by a client to obtain a much wider variety of sentiment granularity options compared to traditional techniques. For example, a client may obtain document-level results, multi-document level results, and results based on entity type. Some embodiments may automatically analyze and segment large scale free-form text in real-time based on granular opinions expressed. Furthermore, various embodiments may allow a client's entity taxonomy to by automatically augmented (e.g., expanded) as documents are processed. Embodiments may also allow an entity taxonomy to be augmented based on a small number of example documents provided by the client.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 12 and described below.

This specification begins with an example of a system for implementing global segmenting and sentiment analysis based on granular opinion detection. An example determining sentiment for documents is presented. A number of different methods and techniques to implement global segmenting and sentiment analysis based on granular opinion detection is discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for global segmenting and sentiment analysis based on granular opinion detection, according to some embodiments.

As shown, a service provider network 102 may include a global segmenting and analysis service 104 that may be used by users of any number of clients that each own/manage a remote client network 106. The provider network may include a compute services 108, a storage services 110 (e.g., database service), and any number of other services 112 that may be used by the global segmenting and analysis service 104 and/or clients. For example, the global segmenting and analysis service 104 may use storage devices of the storage service 110 to store at least some data and/or use the compute service 108 to perform at least some analysis (e.g., by executing models, such as machine learning (ML) models). In embodiments, the service itself may perform some or all of the above functions.

Users may access the provider network 102, including the global segmenting and analysis service 104 and other services, by communicating with the provider network 102 via a wide area network 114 (e.g., the Internet). In embodiments, any number of the users may access the provider network via a stand-alone device (e.g., a smart phone or other mobile/cellular device) or a computing device 116 (e.g., a GUI of the computing device) that is part of a local client network 106 (e.g., a private network of a company). As shown, each client network may include any number of computing devices 116 and/or storage devices 118.

In the example embodiment, the global segmenting and analysis service 104 includes an entity sentiment analyzer 120 that may analyze any number of documents for any number of clients. As discussed below, the entity sentiment analyzer 120 may determine sentiment data (e.g., data and/or metadata describing sentiment) for any number of entities and store the data for each entity into segmented storage 122. As shown, the segmented storage 122 incudes sentiment data for entity X (entity X sentiment data 124), which includes within-document data (for any number of documents), document-level data (for any number of documents), and/or multi-document level data (for any number of documents).

The global segmenting and analysis service 104 also includes a client taxonomy 126 for each client. As shown, the client taxonomy 126 for a particular client (e.g., a client that owns client network 106) may specify any number of different entity types (e.g., person, location, brand, book) and a definition/description for each of those entity types. As described below, the client taxonomy may be augmented (add and/or remove entities) in various ways. For example, a new entity type may be added to the client taxonomy based on analysis of one or more example documents uploaded by a client.

As shown, the global segmenting and analysis service 104 may also include an entity linking 130 data store. In some embodiments, entity linking 130 may store data/metadata describing any entities that have been identified in documents associated with the client (e.g., a unique entity identifier, name(s) for the entity, an entity type associated with (e.g., assigned to) the entity, and/or a unique document identifier for each document the entity was identified in). In embodiments, entity linking 130 may link multiple names (e.g., alternate names) that each refer to a particular entity. For example, one entry in a table may include the unique entity ID and a name for the entity and another entry in the table may include the unique entity ID and an alternate name for the entity. Based on the same entity ID in each entry/row of the table, the service may determine that a document that includes the name of the entity refers to the same entity as another document that includes the alternate name of the entity.

In the depicted embodiment, a user may send a query for sentiment data (e.g., using a GUI of a remote client device, such as computing device 116) to a service interface 132 (e.g., application programming interface) of the global segmenting and analysis service 104. In embodiments, the global segmenting and analysis service 104 may authenticate and/or authorize the user based on credentials provided by the user (e.g., provided via the GUI). In an embodiment, the query may be included as part of a request that also includes the user credentials (e.g., unique user ID, user password). In some embodiments, the global segmenting and analysis service 104 may send the user credentials to another service of the provider network (e.g., an identity and access management service) that performs the authentication and/or authorization of the user based on the user credentials. In that case, the global segmenting and analysis service 104 may then receive, from the other service, an indication of whether the user is authenticated and/or authorized. If not, the request is denied. Otherwise, the global segmenting and analysis service 104 processes the query and provides one or more results to the user.

In embodiments, the global segmenting and analysis service 104 may send the query for sentiment data to the sentiment data retriever 134. The sentiment data retriever 134 may retrieve the requested data from the segmented storage and return the requested data to the user via the service interface 132. In the depicted example, the query is for multi-document level sentiment data for entity X, and the service returns that information back to the user. As discussed herein, a user/client may obtain any other type/amount of sentiment data for an entity from the segmented storage, from highly granular document-level data to higher-level data across multiple documents.

As depicted, any number of other remote networks may each run any number of applications that may each generate any number of documents (e.g., posts, product reviews). For example, a social media site may include many posts from different users that include feedback on a product (e.g., a smart phone model). As another example, a review website may include any number of product reviews for the smart phone model. As shown, the service may receive any number of documents from any number of these applications for processing by the entity sentiment analyzer (e.g., each post or review may be processed as a separate document). In some embodiments, the service may alter the format of each received item (e.g., post, review) into a different format to generate a document for each of the received items.

In embodiments, the service 104 (e.g., the entity sentiment analyzer) may determine different granularities of sentiment for a particular entity over any number of documents and store the sentiment into the segmented storage, where it is available to a client for querying. For different occurrences of a target entity within the document, the service may determine a sentiment polarity and/or intensity for the target entity and at least one cause of the sentiment polarity/intensity (examples are shown in FIG. 2). The sentiment polarity/intensity for the target entity and at least one cause of the sentiment polarity/intensity for each of the occurrences may be stored (e.g., in segmented storage). In embodiments, the entity name and/or other data/metadata for the entity may also be stored (e.g., at the entity linking 130 data store and/or another data store).

Based on the sentiment polarity/intensity for the target entity for the different occurrences, the service may determine a document-level sentiment polarity for the target entity for the entire document. The service may then store the document-level sentiment polarity for the target entity for the document (e.g., in segmented storage).

Based on the document-level sentiment polarity/intensity for the target entity for the document and one or more other document-level sentiment polarities/intensities for the target entity for one or more other documents, the service may determine a multi-document level sentiment polarity for the target entity (e.g., across 10 different documents that the target entity was identified in). The service may then store the multi-document level sentiment polarity for the target entity (e.g., in segmented storage).

The sentiment data for the entity and another number of other entities may be obtained by the client. For example, the service may receive, from the client, a query that indicates the target entity. In embodiments, the query may indicate the multi-document level sentiment polarity for the target entity. In response, the service may return data indicating the multi-document level sentiment polarity for the target entity.

In an embodiment, the query may indicate the multi-document level sentiment polarity for the target entity and other target entities that are also associated with the entity type of the entity taxonomy. In response, the service may return data indicating the multi-document level sentiment polarity for the target entity and for other target entities that are also associated with the entity type of the entity taxonomy.

In embodiments, the query may indicate the document-level sentiment polarity for the target entity for the document and other document-level sentiment polarities for the target entity for other documents. In response, the service may return data indicating the document-level sentiment polarity for the target entity for the document and for other document-level sentiment polarities for the target entity for one or more other documents.

In some embodiments, the query may indicate sentiment polarity for different occurrences of the target entity within the document and/or for different occurrences of the target entity within other document(s). In response, the service may return an indication of the sentiment polarity for different occurrences of the target entity within the document and/or for different occurrences of the target entity within other document(s). As used herein, the term sentiment polarity may be considered to include sentiment intensity as well, in certain embodiments. As used herein, the term sentiment may be considered to include sentiment polarity and sentiment intensity, in certain embodiments.

In embodiments, the service may be able to track changes in sentiment polarity (and intensity) over a period of time for any number of target entities. Different documents are received at different times (e.g., from one or more different source applications) over a period of time. The service may determine, based on analysis of the different documents, a change in the multi-document level sentiment polarity for the target entity over the period of time. For example, the service may determine that sentiment polarity has changed from negative/low intensity to positive/high intensity over a period of one month (based on analysis of documents received over that month). The service may indicate this change to the client (e.g., in response to a query from the client for the change in sentiment over the past month).

As described below, in some embodiments, the service may be able to determine sentiment polarity/intensity for a target entity in a document, even though the service may not know/recognize the entity or a type of the entity. For example, the service may receive a document that includes an occurrence of a new entity that is a target entity in the document (e.g., a target of one or more causes in the document). In embodiments, the service may determine a sentiment polarity/intensity for the new target entity and at least one cause of the sentiment polarity for the new target entity, even though the global segmenting and analysis service has not been trained using the new entity, and even though the new entity is not associated with any of the entity types of the client's entity taxonomy.

Although the depicted example illustrates the segmented storage as storing data as associated with each entity and as associated with different levels of document granularity, data may be segmented and/or associated (e.g., using metadata such as tags) along any number of dimensions. For example, data may be stored in association with positive sentiment and/or negative sentiment for one or more particular targets, which would allow a user to easily query how many positive or negative reviews exist for a particular target.

Figure 2B:
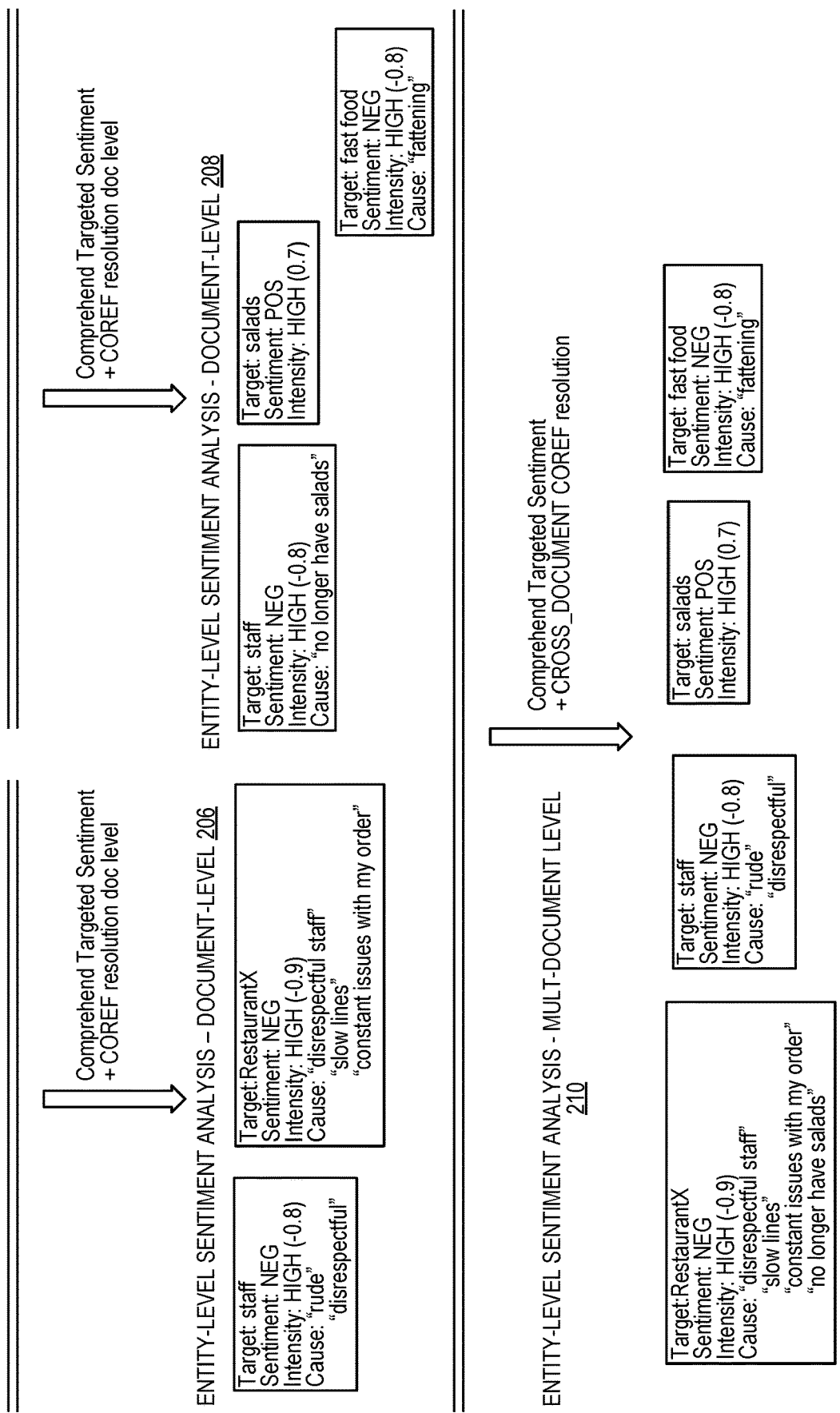

FIGS. 2A and 2B illustrate examples of implementing global segmenting and sentiment analysis based on granular opinion detection on documents, according to some embodiments.

In embodiments, the global segmenting and analysis service 104 may detect sentiment polarity (e.g., positive, negative, mixed, neutral) towards given text spans (e.g., identified as a target entity) in a document. The spans can represent entities (e.g., provider by entity recognition or custom entities), events and their mentions.

The service may ingest a document and provide a span-level sentiment analysis that will contain: the sentiment polarity towards the span; the intensity of the sentiment and the causes of the sentiment (if they exist: causes can be any text span such as verb phrases, clauses, noun phrases). In addition, if used in conjunction with document level coreference resolution (starting with within-document resolution), the service can provide an entity-level sentiment analysis by aggregating the entity-mention/span-level sentiment (the service may provide polarity, intensity, and cause(s)). In embodiments, if used in conjunction with cross-document coreference resolution, the service may provide a multi-document entity-level sentiment analysis (polarity, intensity and cause(s)).

As shown in FIG. 2A, the service performs a span-level sentiment analysis 202 on a first document, resulting in sentiment data for four entity occurrences (two occurrences of "staff," one for "RestaurantX," one for "them"). Similarly, the service performs a span-level sentiment analysis 204 on a second document, resulting in sentiment data for six entity occurrences.

As depicted in FIG. 2B, the service performs a document-level sentiment analysis 206 on a first document, resulting in aggregated document-level sentiment data for two entities (staff, RestaurantX). Similarly, the service performs a document-level sentiment analysis 208 on a second document, resulting in aggregated document-level sentiment data for three entities (staff, salads, fast food). The service then performs a multi-document-level sentiment analysis 210 across the first and second document, resulting in multi-document-level sentiment data for four entities (RestaurantX, staff, salads, fast food).

Figure 3:
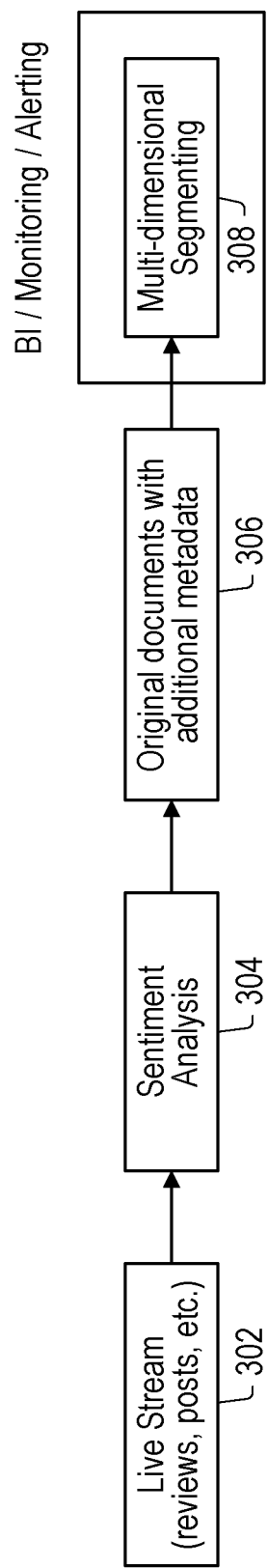
FIG. 3 illustrates an example of a process for implementing global segmenting and sentiment analysis based on granular opinion detection, according to some embodiments.

FIG. 3 illustrates an example of a process for implementing global segmenting and sentiment analysis based on granular opinion detection, according to some embodiments.

As shown, the service may receive/ingest a live stream of documents 302 (e.g., posts, reviews). The documents and/or content of the documents may originate from any number of different applications. The service may perform sentiment analysis 304 (e.g., using the entity sentiment analyzer) and annotate the documents 306 (e.g., add sentiment metadata) based on the sentiment analysis. The documents and/or sentiment metadata for the entity(s) may be segmented across multiple dimensions 308 and stored into segmented storage. The sentiment data/metadata may be available for a client to obtain (e.g., via a query).

In some embodiments, the unstructured nature of public feeds (forum posts, emails, reviews) makes it unavailable for traditional segmenting and analysis in modern business intelligence tools. The global segmenting and analysis service 104 may convert unstructured documents into a formally structured representation, making it available for querying, aggregation, or any other processing as described herein.

FIG. 4 is a illustrates an example of an entity taxonomy of a client, according to some embodiments.

As shown, an entity taxonomy 402 may include any number of different entity types. Each entity type may be associated with a tag. The tag may be added to documents and/or otherwise associated with data of an entity in order to indicate the entity type that a particular entity is associated with (e.g., the entity type an entity is assigned to). For example, an entity in a document that is identified as a person may be associated with the "person" entity type and the tag "PER" may be added as metadata to the document in order to indicate that the entity is assigned as a "person" entity type. As shown, the entity taxonomy 402 also includes a definition for each entity type.

Various embodiments may use different taxonomies with a different number of entity types, different entities, and/or a different number of fields used to describe each entity type. As discussed herein, a taxonomy may be augmented (e.g., changed/modified) in various ways over time. For example, any number of entity types may be added, deleted, and/or changed. In some embodiments, a taxonomy may be generated automatically over time based on analysis of incoming documents.

Figure 5:
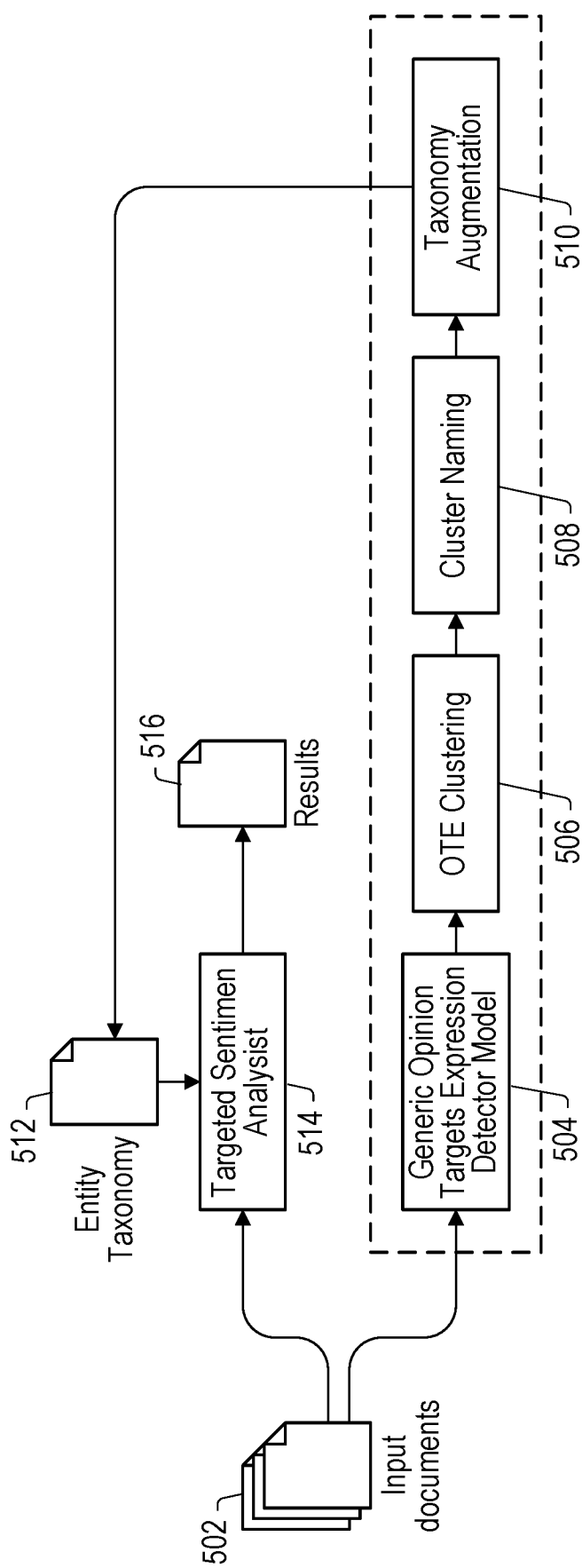
FIG. 5 illustrates an example of a process for automatically augmenting an entity taxonomy using a clustering technique, according to some embodiments.

FIG. 5 illustrates an example of a process for automatically augmenting an entity taxonomy using a clustering technique, according to some embodiments.

In the example embodiment, by implementing a clustering (e.g., grouping) technique, an initial entity taxonomy can be further extended automatically based on data present in the live traffic (e.g., documents) specific to a particular client/customer use case. This may allow a taxonomy to evolve over time automatically without any manual intervention, eliminating the need for any additional annotated data to be provided by a client/customer of the service. At the same time, it may ensure that new products, categories of service, and trends are being captured.

Figure 11:
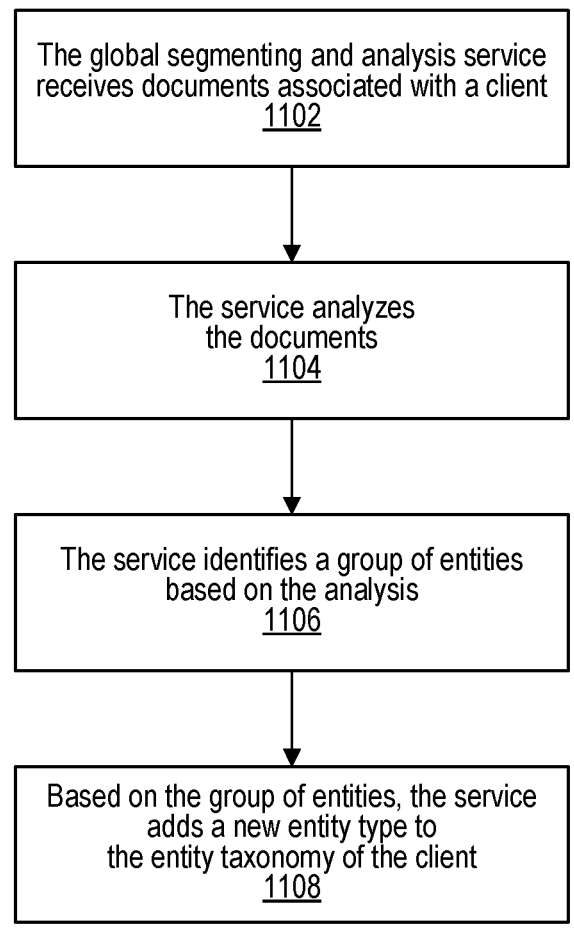
FIG. 11 is a high-level flowchart illustrating various methods and techniques to automatically augment an entity taxonomy using a clustering technique, according to some embodiments.

The service may receive documents 502 and analyze them using a clustering model 504 (e.g., an ML model). Based on the analysis, the service identifies a cluster 506 of entities (e.g., using open-ended targeted expression techniques). Based on the identified cluster of entities, the service may name the cluster 508 (e.g., name a new entity type to be added to the taxonomy). The service may then add the entity type to the taxonomy 510 (including the tag and definition). The updated/augmented entity taxonomy 512 may then be used by the service during sentiment analysis 514 of documents in order to add data/metadata (e.g., add tags for the entity types, including the new types). The results 516 of the analysis (e.g., entity sentiment data/metadata) may then be stored (e.g., at segmented storage). FIG. 11 describes an example process of implementing a clustering technique to automatically augment an entity taxonomy.

Figure 6:
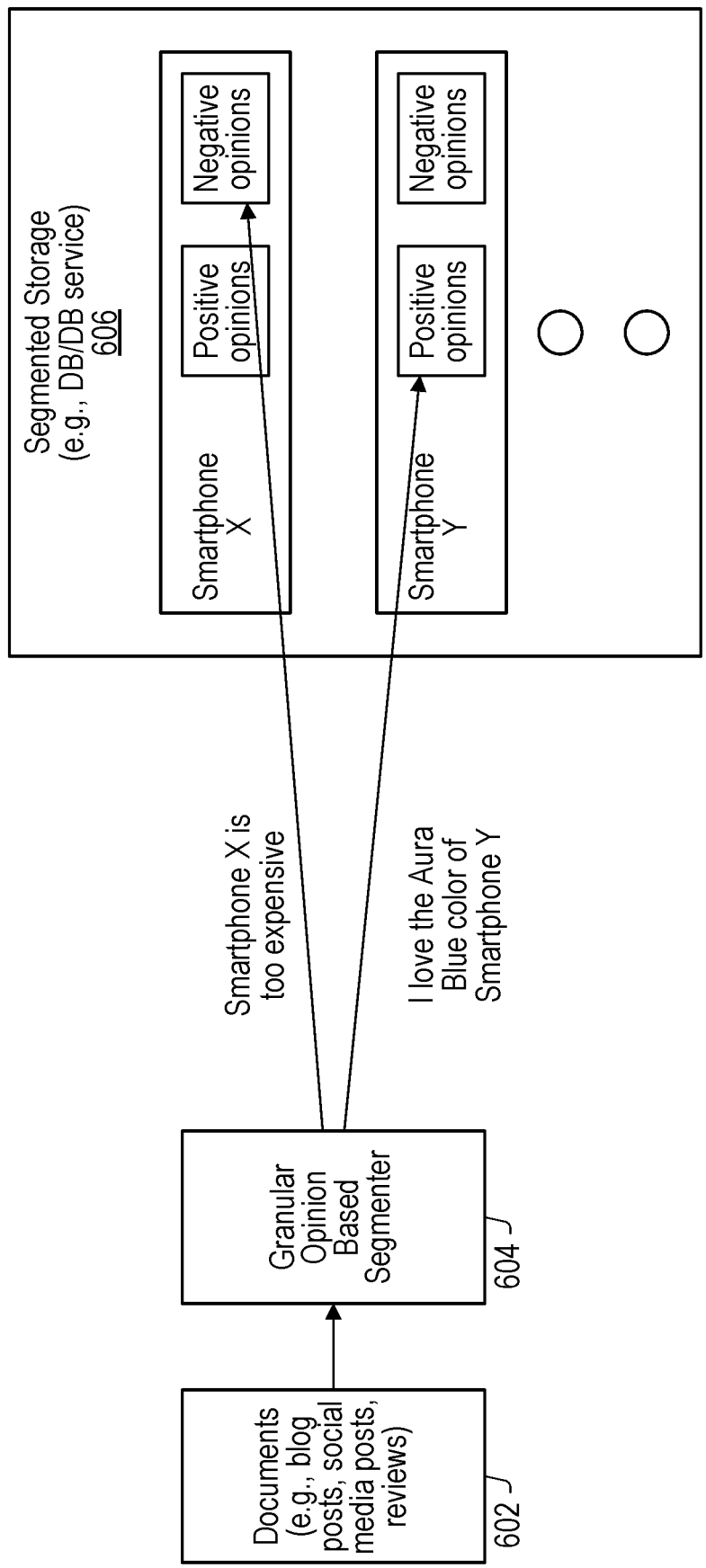
FIG. 6 illustrates an example of a process for implementing global segmenting and sentiment analysis based on granular opinion detection, according to some embodiments.

FIG. 6 illustrates an example of a process for implementing global segmenting and sentiment analysis based on granular opinion detection, according to some embodiments.

As shown, the service may obtain documents 602 from any number of different applications (e.g., as unstructured text). A granular opinion based segmenter (e.g., the entity sentiment analyzer) may analyze each document (e.g., using a trained model. In embodiments, the model may be trained using annotated examples for a client's taxonomy (e.g., entities may be annotated with tags to indicate the entity type). The output of the segmenter 604 may be stored in the segmented storage 606 and partitioned and/or segmented by entity type and/or opinion. In the depicted example, positive opinions and negative opinions are separately stored/ grouped, for two different smartphones.

Figure 7:
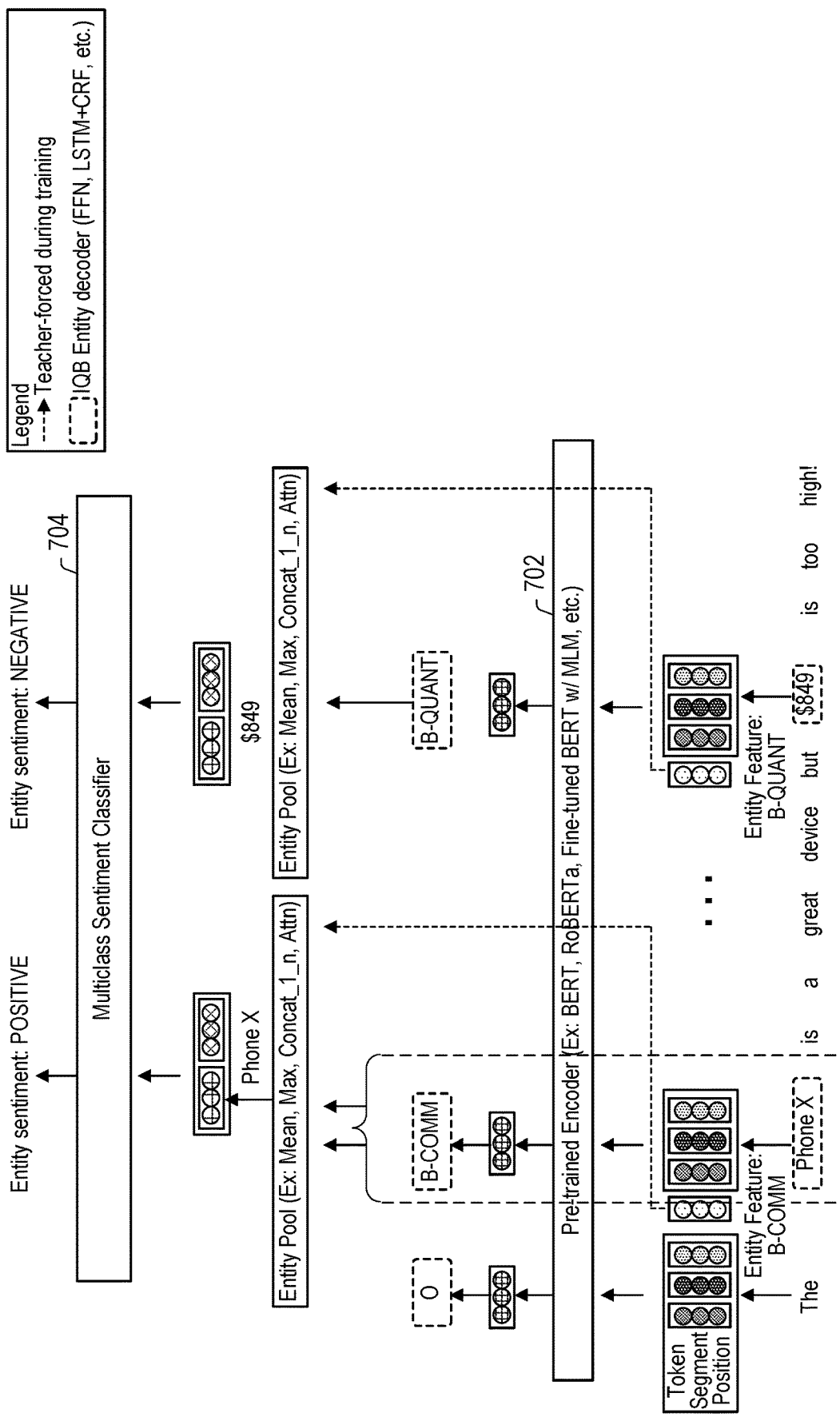
FIG. 7 illustrates an example of a process for determining sentiment for different entities in a document, according to some embodiments.

FIG. 7 illustrates an example of a process for determining sentiment for different entities in a document, according to some embodiments.

In the depicted example, a base model implements a joint task between entity detection and span level classification. The example architecture includes a shared transformer based pre-trained encoder, an entity span detection and type classification using an IOB decoder, and a span-level entity representation used to classify sentiment. As shown, phone X (e.g., the entity identified as the span of text "phone X") is assigned a positive sentiment, while $849 is assigned a negative sentiment. The depicted example architecture may be used to implement this technique (implementing a pre-trained encoder 702 and the multiclass sentiment classifier 704).

Figure 8:
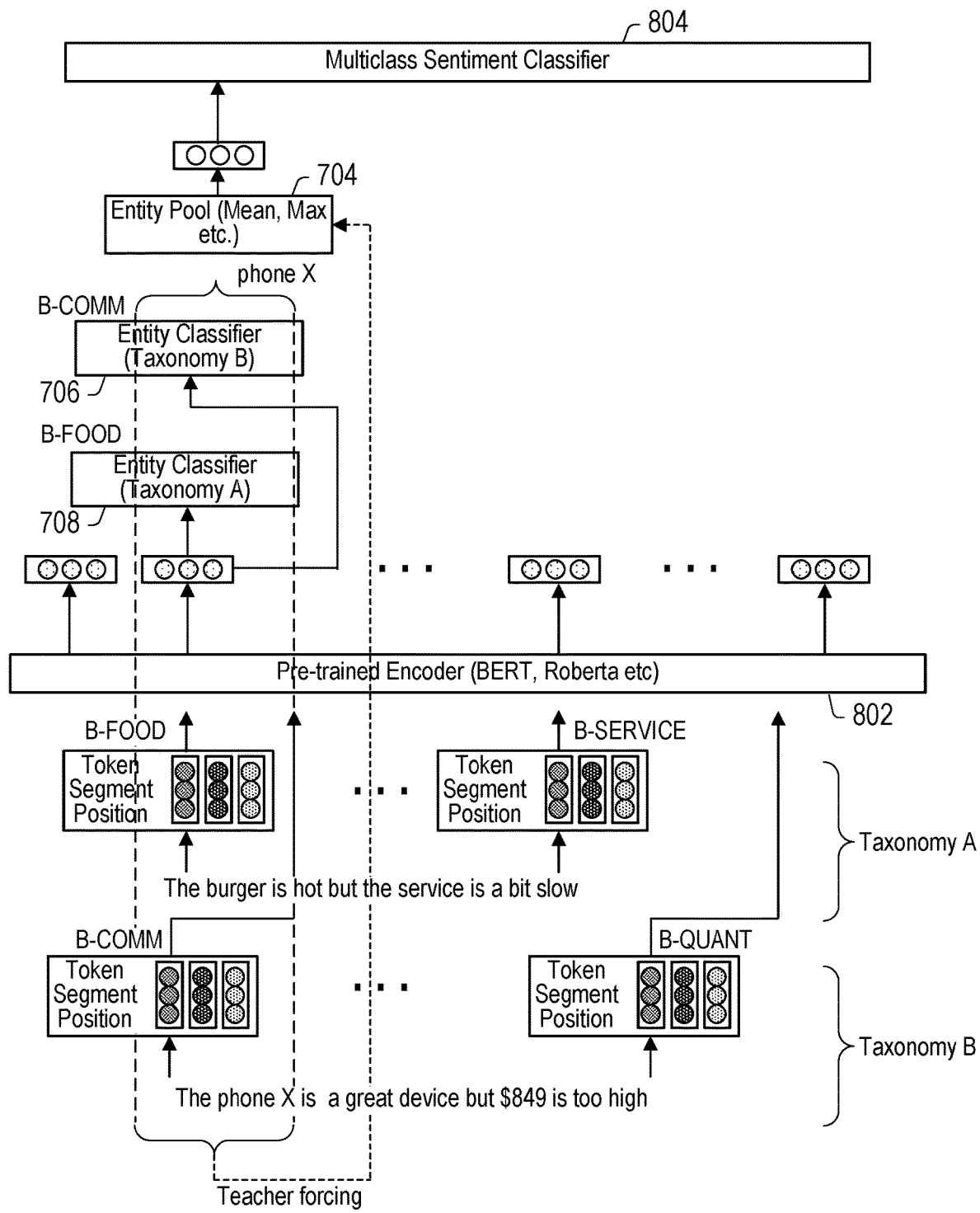
FIG. 8 illustrates another example of a process for determining sentiment for different entities in a document, according to some embodiments.

FIG. 8 illustrates another example of a process for determining sentiment for different entities in a document, according to some embodiments.

In embodiments, one or more sample documents may be provided (e.g., by the client), and the service may augment the client taxonomy based on those samples (e.g., "few-shot" taxonomy augmentation). In embodiments, sentiment of a span may be able to borrow from all types of spans, regardless of entity taxonomy. For example, the service may learn to classify Seattle as positive in the sentence "I loved {Seattle|LOC"}". If the service encounters "I loved {plas|FOOD"}", the service may infer that the associated sentiment is positive, even though the service may not know the meaning of the word "plas" or its taxonomy.

In embodiments, mention level sentiment may borrow from some or all possible span level sentiment datasets and not just one that adheres to a particular taxonomy. The service may try using different datasets for the sequence tagging head while jointly training the sentiment head. This would lead to sequence tagging decoder heads ST_1, ST_2, . . . ST_N for all entity taxonomies and a single span classification head SC. At training time, the service (e.g., models) may train across all datasets for the N heads. At inference time, the service may use the ST corresponding to the tagging taxonomy with SC. The depicted example architecture may be used to implement this technique (implementing a pre-trained encoder 802 and the multiclass sentiment classifier 804).

Figure 9:
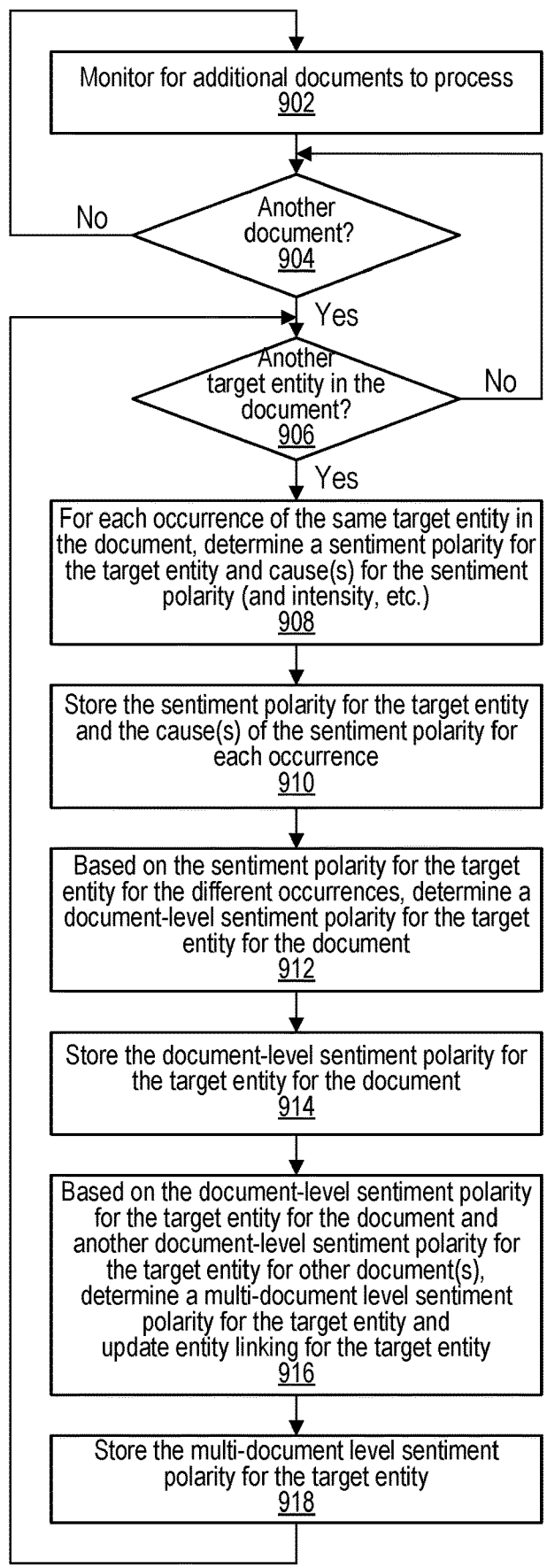
FIG. 9 is a high-level flowchart illustrating various methods and techniques to implement global segmenting and sentiment analysis based on granular opinion detection, according to some embodiments.

FIG. 9 is a high-level flowchart illustrating various methods and techniques to implement global segmenting and sentiment analysis based on granular opinion detection, according to some embodiments. In various embodiments, any of the functionality described for any portions of the flowcharts 9-11 may be performed by any of the components of FIGS. 1-8 and/or 12.

Figure 10:
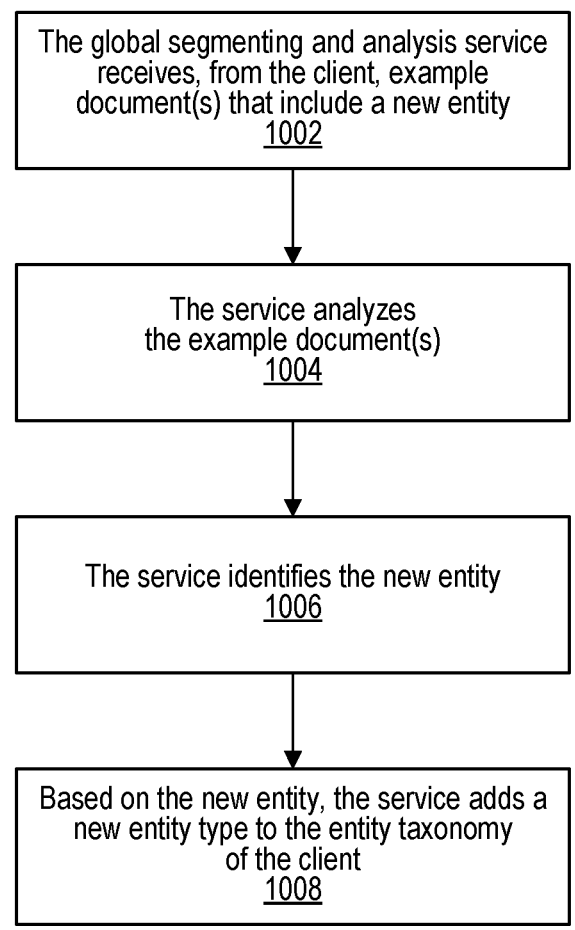
FIG. 10 is a high-level flowchart illustrating various methods and techniques to augment a taxonomy based on sample documents, according to some embodiments.

These techniques, as well as the techniques discussed with regard to FIGS. 10 and 11, may be implemented using components or systems as described above with regard to FIGS. 1-8, as well as other types of components or systems, and thus the following discussion is not intended to be limiting as to the other types of systems that may implement the described techniques. For example, some or all of the techniques may be implemented by a service/tool of a provider network and/or a local service/tool at a client network.

At block 902, the global segmenting and analysis service monitors for additional documents to process. In embodiments, the service receives a stream of documents and therefore, processes the next document received. If another document is received at block 904, then at block 906, the service determines if there is another entity in the document to process. If not, the process returns to block 904. If so, the then at block 908, for each occurrence of the target entity, the service determines a sentiment polarity and cause(s) for the sentiment polarity.

At block 910, the service stores the sentiment polarity and the cause(s) for each occurrence. At block 912, based on the sentiment polarity for the different occurrences, the service determines a document level sentiment polarity for the target entity for the document. At block 914, the service stores the document level sentiment polarity for the target entity for the document. At block 916, based on the document level sentiment polarity for the target entity for the document and another document level sentiment polarity for the target entity for other document(s), the service determines a multi-document level sentiment polarity for the target entity. In embodiments, the service also updates entity linking for the target entity. For example, the service may add new data/metadata to the entity linking 130 data store that indicates the document ID for the document that the entity was identified in and/or add new data/metadata to the entity linking 130 data store that indicates that indicates a new alternate name that was identified for the entity. Based on the updated entity linking data store, the client may query based on the entity name, entity ID, entity type and/or other parameters associated with the entity. For example, the client may query (e.g., using one of the alternate entity names or the entity ID) for how many documents the entity was identified in, the document-level sentiment for the entity for different documents, or the multi-document level sentiment for the entity. At block 918, the service stores the multi-document level sentiment polarity for the target entity. The process then returns to block 906.

FIG. 10 is a high-level flowchart illustrating various methods and techniques to augment a taxonomy based on sample documents, according to some embodiments.

At block 1002, the service receives, from the client, example document(s) that include a new entity. At block 1004, the service analyzes the example document(s). In embodiments, the service may use one or more models (e.g., trained ML models or other type of model) to perform at least a portion of the analysis. At block 1006, the service identifies the new entity based on the analysis. At block 1008, based on the identified new entity, the service adds a new entity type to the entity taxonomy for the client.

FIG. 11 is a high-level flowchart illustrating various methods and techniques to automatically augment an entity taxonomy using a clustering technique, according to some embodiments.

At block 1102, the service receives documents associated with the client (e.g., posts, reviews from applications). At block 1104, the service analyzes the documents. In embodiment, the service may analyze, based on one or more criteria, multiple documents. In embodiments, the service may use one or more trained models or other algorithm to perform the analysis and/or identification of entities. At block 1106, the service identifies a group (e.g., a cluster) of entities based on the analysis. For example, the service may identify, based on the analysis, any number of new entities that are similar according to one or more criteria/rules. In embodiments, a new entity may be an entity identified in a document that has not been previously identified or associated with an entity type of the client taxonomy. For example, the occurrence(s) of the new entity in the document may be the first time the service has identified the entity in any documents. The service may identify/analyze any particular number of new entities over any number of documents and based on one or more criteria, the service may determine that the new entities belong to the same group.

For example, the service may determine that 20 different entities are cars and that all 20 entities belong to the same group of cars based on one or more criteria (e.g., each car shares one or more common features, e.g., the ability to hold six or more passengers). The service may then add a new entity type to the taxonomy called "large capacity car" and associate/assign each of the 20 entities with that entity type (e.g., by adding to a data store an entity name/ID for each entity along with metadata indicating it is a "large capacity car" entity type). In the future, when the service identifies another new entity as a car that holds 10 passengers, then it may associate the new entity with the entity type "large capacity car."

At block 1108, based on the identified group of entities, the service adds a new entity type to the entity taxonomy for the client. In some embodiments, the service may generate the client taxonomy as discussed above, starting from scratch. In other words, the client may not provide a client taxonomy and instead allow the service generate the client taxonomy based on analyzing incoming documents (e.g., based on one or more criteria), identifying groups of entities based on the analysis, and adding a new entity type based on each identified group of entities. For example, based on analyzing 1000 documents, the service may generate a taxonomy that includes a "small capacity car" type (e.g., cars that can hold two or less passengers), a "medium capacity car" type (e.g., cars that can hold from three to five passengers), and a "large capacity car" type (e.g., cars that can hold six or more passengers).

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may implement the functionality described herein (e.g., the functionality of the service and any other components that implement the techniques described herein). The various methods as illustrated in the figures and described herein represent example embodiments of methods. The order of any method may be changed, and various elements may be added, reordered, combined, omitted, modified, etc.

Figure 12:
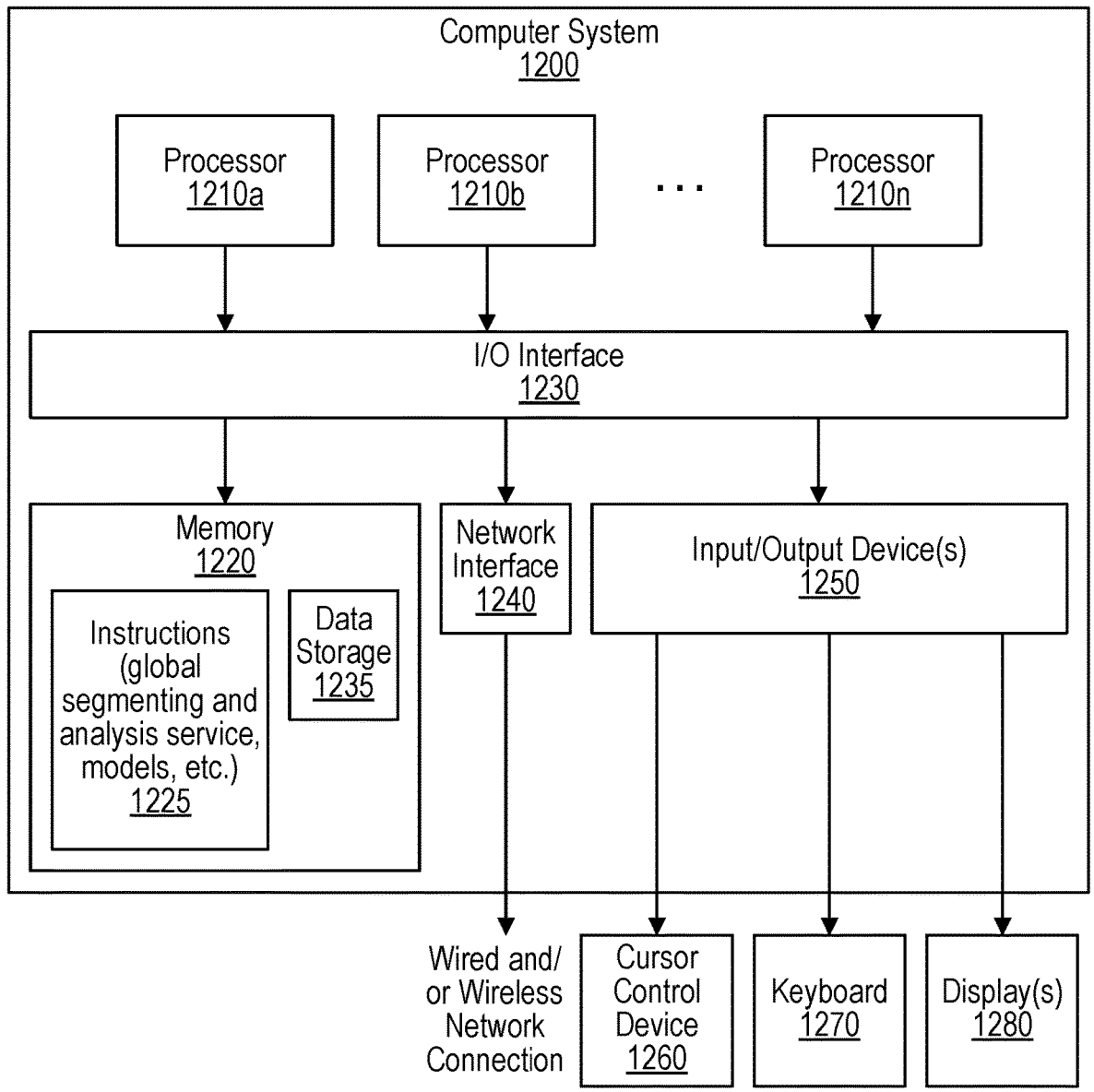
FIG. 12 is a block diagram illustrating an example computing system, according to some embodiments.

Embodiments to implement global segmenting and sentiment analysis based on granular opinion detection may by implemented by and/or interact with various systems or devices. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. Display(s) may include standard computer monitor(s) and/or other display systems, technologies or devices, in one embodiment. In some embodiments, it is contemplated that embodiments may be implemented using a single instance of computer system 1200, while in other embodiments multiple such systems, or multiple nodes making up computer system 1200, may host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions, in one embodiment. For example, in various embodiments, processors 1210 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1220 may store program instructions 1225 and/or data accessible by processor 1210, in one embodiment. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., services and any other components, etc.) are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. A computer-accessible medium may include non-transitory storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240, in one embodiment.

In one embodiment, I/O interface 1230 may be coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may allow data to be exchanged between computer system 1200 and other devices attached to a network, such as other computer systems, or between nodes of computer system 1200, in one embodiment. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200, in one embodiment. Multiple input/output devices 1250 may be present in computer system 1200 or may be distributed on various nodes of computer system 1200, in one embodiment. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225 that implement the various embodiments of the systems as described herein, and data store 1235, comprising various data accessible by program instructions 1225, in one embodiment. In one embodiment, program instructions 1225 may include software elements of embodiments as described herein and as illustrated in the Figures. Data storage 1235 may include data that may be used in embodiments (e.g., documents, models, taxonomy, sentiment data, etc.). In other embodiments, other or different software elements and data may be included.

Those skilled in the art will appreciate that computer system 1200 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1200 may be transmitted to computer system 1200 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
 a global segmenting and analysis service hosted by a provider network and Internet-accessible by a plurality of clients, wherein the global segmenting and analysis service comprises one or more processors and one or more memories to store computer-executable instructions that, when executed, cause the one or more processors to, for a given client:
  receive a plurality of documents comprising text, wherein for a given one of the documents, the global segmenting and analysis service is configured to identify one or more target entities respectively associated with an entity type of an entity taxonomy of the client, and wherein for a given target entity, the global segmenting and analysis service is configured to:
   for different occurrences of the target entity within the document, determine a sentiment polarity for the target entity and at least one cause of the sentiment polarity;
   store the sentiment polarity for the target entity and the at least one cause of the sentiment polarity for the different occurrences;
   based on the sentiment polarity for the target entity for the different occurrences, determine a document-level sentiment polarity for the target entity for the document;
   store the document-level sentiment polarity for the target entity for the document; and
   determine an additional sentiment polarity for the target entity as a multi-document level sentiment polarity for the target entity based on the document-level sentiment polarity for the target entity previously determined for the document and at least another document-level sentiment polarity for the target entity previously determined for at least another document of the plurality of documents;
   store the multi-document level sentiment polarity for the target entity;
  receive, from the client, a query that indicates at least the target entity or the entity type associated with the target entity; and
  in response to the query, provide to the client at least one or more of:
   the multi-document level sentiment polarity for the target entity, a multi-document level sentiment polarity for target entity and other target entities that are also associated with the entity type of the entity taxonomy, or the document-level sentiment polarity for the target entity for the document and at least the other document-level sentiment polarity for the target entity for at least the other document.

2. The system as recited in claim 1, wherein the global segmenting and analysis service is further configured to:
in response to the query, provide the sentiment polarity for the different occurrences of the target entity within the document and sentiment polarity for different occurrences of the target entity within the other document.

3. The system as recited in claim 1, wherein the global segmenting and analysis service is further configured to:
receive, from the client, one or more example documents that comprise a new entity;
analyze the one or more example documents; and
based on the analysis of the one or more example documents:
identify the new entity; and
add a new entity type to the entity taxonomy of the client, wherein the new entity type is based on the identified new entity.

4. The system as recited in claim 1, wherein the global segmenting and analysis service is further configured to:
receive a plurality of additional documents associated with the client;
analyze, based on one or more criteria, the plurality of additional documents; and
based on the analysis of the plurality of additional documents:
identify a group of entities; and
based on the identified group of entities, add a new entity type to the entity taxonomy of the client.

5. The system as recited in claim 1, wherein the sentiment polarity for the target entity comprises the sentiment polarity for the target entity and a sentiment intensity associated with the sentiment polarity, and wherein the sentiment intensity indicates a magnitude of the sentiment polarity.

6. A method, comprising:
performing, for a client by a global segmenting and analysis service implemented by one or more computing devices of a provider network:
receiving a plurality of documents;
for a given one of the plurality of documents:
identifying a plurality of occurrences of a target entity within the document, wherein the target entity is associated with an entity type of an entity taxonomy of the client;
for different occurrences of the plurality of occurrences of the target entity, determining a sentiment polarity for the target entity and at least one cause of the sentiment polarity; and
based on the sentiment polarity for the target entity for the different occurrences, determining a document-level sentiment polarity for the target entity for the document;
determining an additional sentiment polarity for the target entity as a multi-document level sentiment polarity for the target entity based on the document-level sentiment polarity for the target entity previously determined for the document and at least another document-level sentiment polarity for the target entity previously determined for at least another document of the plurality of documents; and providing, to the client, at least one or more of:
the multi-document level sentiment polarity for the target entity,
a multi-document level sentiment polarity for the target entity and other target entities that are also associated with the entity type of the entity taxonomy, or
the document-level sentiment polarity for the target entity for the document and at least the other document-level sentiment polarity for the target entity for at least the other document.

7. The method as recited in claim 6, further comprising:
providing the sentiment polarity for the different occurrences of the target entity within the document and sentiment polarity for different occurrences of the target entity within the other document.

8. The method as recited in claim 6, further comprising:
receiving, from the client, one or more example documents that comprise a new entity;
analyzing the one or more example documents; and
based on the analysis of the one or more example documents:
identifying the new entity; and
adding a new entity type to the entity taxonomy of the client, wherein the new entity type is based on the identified new entity.

9. The method as recited in claim 6, further comprising:
receiving, from the client, an additional document that comprises an occurrence of a new entity as a new target entity; and
determining a sentiment polarity for the new target entity and at least one cause of the sentiment polarity for the new target entity, wherein the global segmenting and analysis service has not been trained using the new entity, and wherein the new entity is not associated with any of the entity types of the entity taxonomy.

10. The method as recited in claim 6, further comprising:
receiving a plurality of additional documents;
analyzing, based on one or more criteria, the plurality of additional documents; and
based on the analysis of the plurality of additional documents:
identifying a group of entities; and
based on the identified group of entities, adding a new entity type to the entity taxonomy of the client.

11. The method as recited in claim 6, further comprising:
linking, in a data store, a plurality of names that each refer to a particular entity, wherein one of the plurality of documents comprises one of the plurality of names for the particular entity and another of the plurality of documents comprises another of the plurality of names for the particular entity.

12. The method as recited in claim 6, wherein different documents of the plurality of documents originate from different applications.

13. The method as recited in claim 6, wherein different ones of the plurality of documents are received by the global segmenting and analysis service at different times over a period of time, and further comprising:
determining, based on analysis of the plurality of documents, a change in the multi-document level sentiment polarity for the target entity over the period of time; and
providing, to the client, an indication of the change in the multi-document level sentiment polarity for the target entity.

14. The method as recited in claim 6, wherein the global segmenting and analysis service is Internet-accessible by a plurality of clients via a service interface, and wherein the provider network offers a plurality of services including the global segmenting and analysis service.

15. One or more non-transitory computer-accessible storage media storing program instructions that when executed on or across one or more processors of a provider network cause the one or more processors to implement a global segmenting and analysis service to:

receive a plurality of documents;
for a given one of the plurality of documents:
identify a plurality of occurrences of a target entity within the document, wherein the target entity is associated with an entity type of an entity taxonomy of the client;
for different occurrences of the plurality of occurrences of the target entity, determine a sentiment polarity for the target entity and at least one cause of the sentiment polarity; and
based on the sentiment polarity for the target entity for the different occurrences, determine a document-level sentiment polarity for the target entity for the document;
determine an additional sentiment polarity for the target entity as a multi-document level sentiment polarity for the target entity based on the document-level sentiment polarity for the target entity previously determined for the document and at least another document-level sentiment polarity for the target entity previously determined for at least another document of the plurality of documents; and
store data indicating one or more of the multi-document level sentiment polarity for the target entity or the document-level sentiment polarity for the target entity for the document, wherein the data is available for retrieval by the client.

16. The one or more storage media as recited in claim 15, wherein the program instructions when executed on or across the one or more processors further cause the one or more processors to implement the global segmenting and analysis service to:

store data indicating the sentiment polarity for the different occurrences of the target entity within the document and sentiment polarity for different occurrences of the target entity within the other document.

17. The one or more storage media as recited in claim 15, wherein the program instructions when executed on or across the one or more processors further cause the one or more processors to implement the global segmenting and analysis service to:

receive, from the client, one or more example documents that comprise a new entity;
analyze the one or more example documents; and
based on the analysis of the one or more example documents:
identify the new entity; and
add a new entity type to the entity taxonomy of the client, wherein the new entity type is based on the identified new entity.

18. The one or more storage media as recited in claim 15, wherein the program instructions when executed on or across the one or more processors further cause the one or more processors to implement the global segmenting and analysis service to:

receive a plurality of additional documents associated with the client;
analyze the plurality of additional documents;
based on the analysis of the plurality of additional documents:
identify a group of entities; and
based on the identified group of entities, add a new entity type to the entity taxonomy of the client.

19. The one or more storage media as recited in claim 15, wherein the sentiment polarity for the target entity comprises the sentiment polarity for the target entity and a sentiment intensity associated with the sentiment polarity.

20. The one or more storage media as recited in claim 15, wherein to identify a given occurrence of the plurality of occurrences of the target entity within the document, the program instructions when executed on or across the one or more processors further cause the one or more processors to implement the global segmenting and analysis service to:

determine that a span of text within the document corresponds to a name for the entity; and
identify the span of text as the occurrence of the target entity.

* * * * *